United States Patent

Wenzel

[11] Patent Number: 4,570,784
[45] Date of Patent: Feb. 18, 1986

[54] DEVICE FOR RAISING FISH INTO UNIFORM, UPRIGHT BELLY-BACK POSITION

[75] Inventor: Werner Wenzel, Lübeck, Fed. Rep. of Germany

[73] Assignee: Nordischer Maschinenbau Rud. Baader GmbH & Co KG, Lubeck, Fed. Rep. of Germany

[21] Appl. No.: 593,568

[22] Filed: Mar. 26, 1984

[30] Foreign Application Priority Data

Mar. 30, 1983 [DE] Fed. Rep. of Germany ....... 3311583

[51] Int. Cl.$^4$ ............................................. B65G 47/24
[52] U.S. Cl. ......................................... 198/399; 17/55
[58] Field of Search ....................... 198/399; 17/55, 24

[56] References Cited

U.S. PATENT DOCUMENTS 1,689,919 10/1928 Heath ...................................... 17/55
2,232,089 2/1941 Wool ................................. 198/399 X
3,237,750 3/1966 Eriksen ................................ 17/55 X
4,270,650 6/1981 Krohn ................................. 17/55 X

FOREIGN PATENT DOCUMENTS 1912687 11/1978 Fed. Rep. of Germany ...... 198/399

Primary Examiner—Frank T. Yost
Attorney, Agent, or Firm—Edward F. Levy

[57] ABSTRACT

The invention relates to a device for raising fish into uniform belly-back position. To improve the effect of an uprighting station comprising a guiding chute for the fish lying on their side and a controlling edge arranged above the longitudinal center of the guiding chute to yield resiliently, it is suggested to form the controlling edge as a periphery of a rotatingly driven circular disk. The repulsing effect realized under the conveying operation effects a secure aligning of the fish even when their quality is influenced by distortions and deformations or damages in the head area, and also makes it possible to raise headless fish.

20 Claims, 4 Drawing Figures

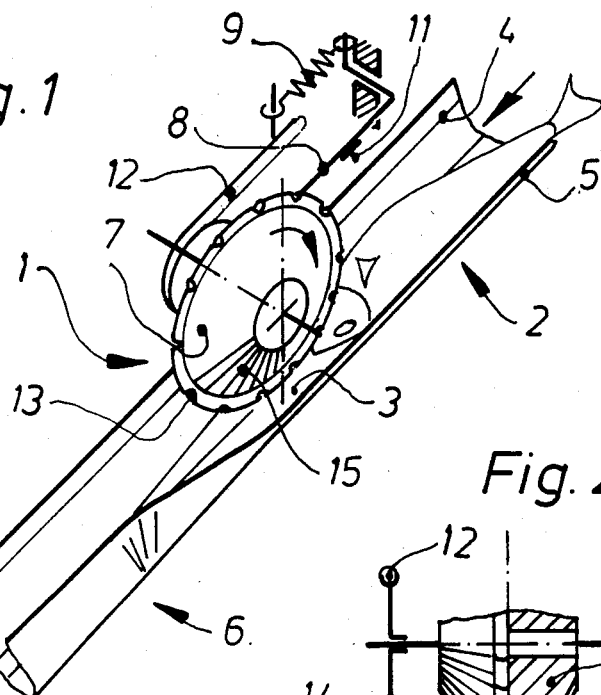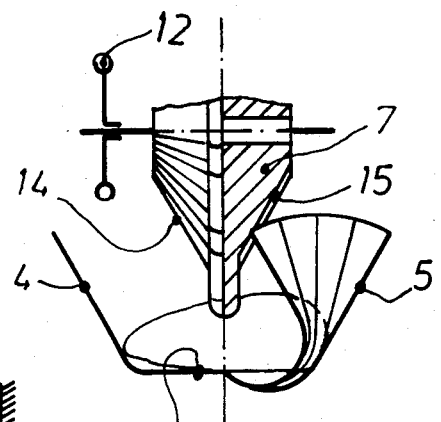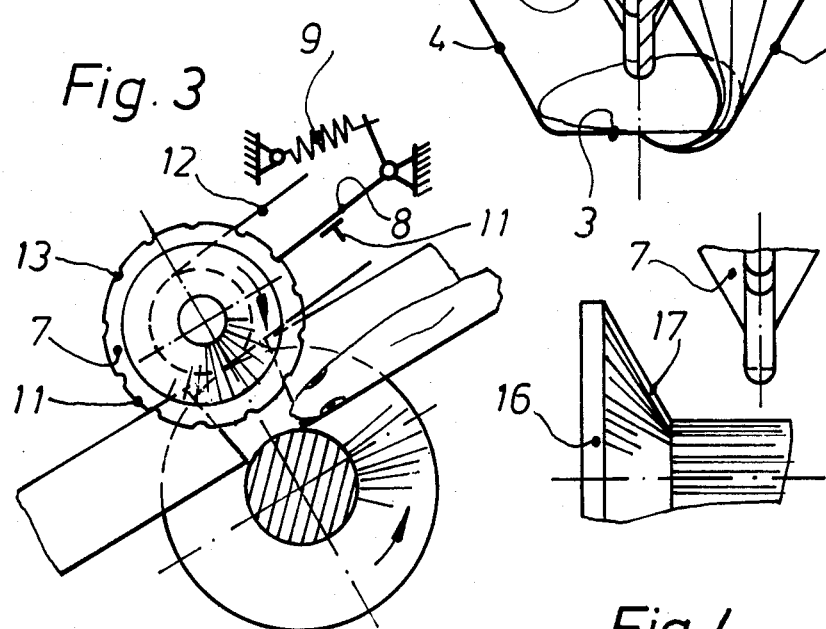

DEVICE FOR RAISING FISH INTO UNIFORM, UPRIGHT BELLY-BACK POSITION

BACKGROUND OF THE INVENTION

1. Field of the Invention

The invention concerns a device for raising or erecting fish into uniform upright belly-back position, the device comprising a guiding chute guiding the fish lying on one of their sides and in the direction of their longitudinal axis as well as an uprighting station including a controlling edge arranged above its longitudinal center edge, which edge, together with a guiding chute forms a passage variable by displacement.

2. Description of Prior Art

Such a device is known from Norwegian Pat. No. 104 933. It has a channel arranged inclined for the longitudinal guiding of the fish, a controlling plate being arranged to yield resiliently above the longitudinal center of the channel. The cross-section of the controlling plate is formed V-shaped in the region of its free end, the ridge line standing opposite the bottom of the channel and serving as a controlling edge.

Another device having a storing channel arranged inclined can be taken from DE-OS No. 27 17 483, which channel receives the fish lying on their back and carries out an oscillating movement in order to convey the fish, if necessary. A rail is positioned above the longitudinal centre of the storing channel, which rail has the object of limiting the lateral free space of the fish in such a manner that on the one hand fish of differing thicknesses can be conveyed and on the other a blocking is avoided.

Further, similar devices can be taken from Russian Certificate of Authorship No. 109 910, Norwegian Pat. No. 99 152, British Pat. No. 13 531 and German Pat. No. 21 02 590. These suggestions show guiding chutes with cross-section forms differing along their lengths, which chutes are to raise the fish into an upright, uniform belly-back position by using the kinetic energy of the fish produced by gravity and due to their center of gravity being eccentric with respect to the fish height.

As practice has shown, a sufficiently secure function cannot be achieved with correspondingly formed devices. This is because at least a part of the fish to be handled have a differing center of gravity and/or contour due to distortion and/or damages, recently occurring more and more due to set or drift net fishing so that incorrect influences occur. Furthermore the fish tend to block which leads to a congestion or breakdown of the machine.

3. Object of the Invention

It is therefore the object of the invention to improve the known concept such that the effectiveness of the device is guaranteed, largely independent of the quality of the fish to be handled and with lowest insecurity rate, wherein fish having no head can be brought to an upright position as well.

SUMMARY OF THE INVENTION

In a device comprising a guiding chute guiding the fish lying on one of their sides and in the direction of their longitudinal axis as well as an uprighting station including a controlling edge arranged above its longitudinal center, which edge, together with the guiding chute, forms a passage variable by displacement, this object is achieved according to the invention in that the controlling edge is formed as the periphery of a rotatingly driven circular disc and the cross-section of the guiding chute as an essentially symmetrical trapezoid.

The advantages thus achieved consist in particular in that the known uprighting effect which uses the dissymmetry of the cross-section of the fish ensues under conveying engagement, whereby a secure raising of the fish to a vertical position is achieved, since the production and introduction of the raising forces occurs dynamically. From the uniform belly-back position thus obtained the fish may be brought into a uniform side position subsequently by appropriate means.

Advantageously a malfunction of the device by the introduction of distorted fish damaged at their head and/or headless can be avoided in that the distance of the periphery of the circular disc from a bottom surface of the guiding channel corresponds to approximately 80% of the thickness of the smallest fish to be handled in the device.

The periphery of the circular disc preferably having a gripping surface formed by grooves or teeth running essentially parallel to the axis of the circular disc guarantees on the one hand a certain positiveness of engagement and thus, in particular, the effectiveness of the conveying gripping and on the other the fish is given the possibility of yielding transversely to the conveying direction during the conveying.

A designing of the periphery of the circular disc with an essentially semicircular cross-section ensures that the fish quality is not affected.

In order to maintain the conveying engagement during the total raising process the flanks of the circular disc can be provided with a radially extending toothing.

An economic and very delicately working device results expediently if the circular disc is arranged pivotal about an axis fixed to a machine frame and the guiding chute is designed to yield resiliently in the plane of symmetry of the circular disc.

A further improvement in the function can be achieved if a rotational body rotatingly driven about an axis essentially parallel to the axis of the circular disc is placed opposite the latter and with its generated surface extending a small amount above the inner surfaces of the guiding chute through a bottom surface thereof and its side walls. Expediently, the generated surface of the rotational body can have a cross-section profile which corresponds essentially to the cross-section of the guiding chute.

In order to deliver the fish in uniform sidewise position in a preferred and constructively simple manner the guiding channel is provided to open into a turning chute whose cross-section merges into an essentially parallelogram-shaped cross-section immediately downstream of the uprighting station by torsion of at least one of the side walls of the guiding chute.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows an axonometrical view of the device, FIG. 2 shows a front view of the device as seen from the turning chute with representation of the locally different cross-section forms of the guiding chute and turning chute in a nested arrangement, FIG. 3 shows a partial longitudinal section through a modified device, and FIG. 4 shows a cross-section through the device according to FIG. 3.

DETAILED DESCRIPTION OF THE PREFERRED EMBODIMENT

An uprighting station 1 represented in FIG. 1 is positioned in a device for raising fish into an upright position, which uprighting station 1, according to the desired flow rate performance, is arranged either singly or together with others as part of a group arrangement in a not-shown frame of an automatic aligning and/or supplying device. The uprighting station 1 comprises a guiding chute 2 having a bottom surface 3 from which side walls 4 and 5 extend upwardly so that the enclosed cross-section has the form of a symmetrical trapezoid, the width of the bottom surface 3 corresponding approximately to the width of the smallest fish to be handled in the device. The guiding chute 2 opens into a turning chute 6, one side wall of which is formed by extending the side wall 4 and the other is formed by continuing the side wall 5 by twisting. The twisting is carried out such that the inner surfaces of the side walls of the turning chute 6 stand opposite each other extending essentially parallel to each other. A circular disc 7 driven rotatingly in the plane of symmetry of the cross-section of the guiding chute 2 is positioned above the bottom surface 3 in the region directly in front of, i.e. upstream of the position in which the guide chute 2 merges into the turning chute 6. The circular disc 7 is mounted on an oscillating crank 8 which is designed to be able to yield against the force of a spring 9 in a plane perpendicular to the bottom surface 3. The oscillating crank 8 is supported by means of a stop or buffer 10 in such a manner that the distance of its periphery 11 to the bottom surface 3 is about 80% of the thickness of the smallest fish to be handled in the device. The circular disc 7 driven e.g. by a belt drive 12 has grooves 13 distributed along its periphery and has the cross-section profile of a double conic frustum whose lateral or generated surfaces 14 are formed to have gripping ability e.g. by a fine radial toothing 15 and whose generating lines include an angle which corresponds approximately to that of the side walls 4 and 5 of the guiding chute 3.

In the embodiment of the device according to FIGS. 3 and 4 a rotational body 16 also driven is opposed to the circular disc 7. Its generated surface 17 is profiled corresponding to the cross-section of the guiding chute 2 and effective as a conveying surface, for which purpose the guiding chute 2 has interruptions through which the generated surface 17 extends a small amount into the guiding chute 2.

The method of operation of the device is the following:

A fish 18 lying on its side in the guiding chute 2 is moved forwards in a supported manner by vibration movement of the chute 2 and/or water supply. Due to the cross-sectional design and the size of the profile of the guiding chute 2 the fish undergoes an aligning of such a type that it touches the side walls 4 and 5 equally with its belly and back. Due to the drop-shaped cross-section of the fish this aligning has the consequence that the largest thickness of its body cross-section comes to rest next to the longitudinal center of the bottom surface 3 of the guiding chute 2. In this position the fish comes into functional relationship with the circular disc 7 arranged centrally above the bottom surface by touching its rotating periphery 11. The contact occurs on the other side of the largest cross-sectional thickness of the fish. Due to that the circular disc 7 held down by the spring 9 has the tendency to move out into regions of smaller cross-sectional thickness which tendency, however, is eliminated by the rigid lateral guiding of the circular disc 7. The consequence thereof is that the fish shoves itself upwardly, back first on the corresponding respective side wall 4 or 5 until it passes the narrowest position between the corresponding side wall 4 or 5 and the lateral surface 14 of the circular disc 7 formed as a double conic frustrum with conveying engagement by the lateral surface 14 of the disc 7 with its back facing upwardly.

FIGS. 1 and 2 show, by way of example, a fish lying on its side in guiding chute 2 in the incorrect or undesired position with its relatively thick back facing to the right and engaging the inclined side wall 5 of the guiding chute. As the fish passes beneath the circular disc 7, which is downwardly biased by spring 9, the peripheral portion 11 of disc 7 presses downwardly on the exposed side of the fish, as shown in FIG. 3, and causes the fish to slide laterally to the right along the bottom wall 3 and up the inclined side wall 5. In this elevated back-up position, the fish advances to the turning chute 6, in which the twisted extension of side wall 5 turns the fish and inverts it from its initial position of arrival to the correct desired belly-back alignment, that is with its back facing toward the left.

For the purpose of secure conveying of the fish the profile of the guiding chute 2 can be formed in the region of the circular disc 7 by the generated surface 17 of a driven rotational body 16 standing opposite the circular disc 7.

It should be understood that fish which are already supplied in the desired correct position in the guiding chute 2, i.e. with their back facing the right side wall 4 and thus in an opposite position to the fish shown in the drawings, will only be raised back first up and along the side wall 4. Due to the continuation of the inclination of the side wall 4 in the turning chute 6 they will slide down again belly first once they have passed the circular disc 7, thus again taking their original position, which is the above mentioned uniform position as is now also obtained by the fish shown in the drawings following their turning due to the effect of the structure of the left side wall 5 and its twisted position.

What is claimed is:

1. A device for raising fish of a different size at least having two sides, a belly, a back, a head end and a tail end, and extending from said head end to said tail end along a longitudinal axis, into a uniform upright belly-back position, said device comprising
    (a) machine frame means,
    (b) guiding chute means arranged on said machine frame means for guiding said fish lying on one of said sides and essentially in the direction of said longitudinal axis and
    (c) an uprighting station arranged on said machine frame means for defining a longitudinal center and including controlling edge means arranged substantially above said longitudinal center, (d) said controlling edge means, together with said guiding chute means, forming therebetween a passage variable by displacement of one of said means relative to the other,
wherein
(e) said controlling edge means are formed by a periphery defined by circular disc means rotatingly driven about a disc axis and
(f) said guiding chute means at least in the region of said uprighting station having a substantially symmetrical U-shaped cross section formed by a bottom wall and diverging side walls upstanding therefrom, with said bottom wall defining substantially planar bottom surface means of said guiding chute means,
whereby said fish, upon entering said passage are contacted by said controlling edge means and urged by said contact transversely along said flat planar bottom surface means and upwardly along one of said opposing side walls in a direction toward the thicker of said back and belly thereof.

2. A device as claimed in claim 1, wherein the distance of said periphery of said circular disc means from said bottom surface means corresponds to approximately 80% of the thickness of the smallest of said fish to be handled in said device.

3. A device as claimed in claim 1, wherein said periphery of said circular disc means has gripping surface means formed by means of grooves running essentially parallel to an axis of said circular disc means.

4. A device as claimed in claim 2, wherein said periphery of said circular disc means has gripping surface means formed by means of grooves running essentially parallel to an axis of said circular disc means.

5. A device as claimed in claim 1, wherein said circular disc means have an essentially semicircular shaped cross-section in the region of said periphery.

6. A device as claimed in claim 2, wherein said circular disc means have an essentially semicircular shaped cross-section in the region of said periphery.

7. A device as claimed in claim 1, wherein said circular disc means define lateral surface means designed as conical surfaces which form an essentially parallel passage with said opposing side wall means of said guiding chute means.

8. A device as claimed in claim 2, wherein said circular disc means define lateral surface means designed as conical surfaces which form an essentially parallel passage with said opposing side wall means of said guiding chute means.

9. A device as claimed in claim 3, wherein said circular disc means define lateral surface means designed as conical surfaces which form an essentially parallel passage with said opposing side wall means of said guiding chute means.

10. A device as claimed in claim 7, wherein said lateral surface means of said circular disc means are formed as gripping surfaces by radial toothings.

11. A device as claimed in claim 8, wherein said lateral surface means of said circular disc means are formed as gripping surfaces by radial toothings.

12. A device as claimed in claim 1, wherein said circular disc means are arranged pivotal about an axis fixedly arranged on said machine frame.

13. A device as claimed in claim 2, wherein said circular disc means are arranged pivotal about an axis fixedly arranged on said machine frame.

14. A device as claimed in claim 7, wherein said circular disc means are arranged pivotal about an axis fixedly arranged on said machine frame.

15. A device as claimed in claim 1, wherein rotational body means rotatingly driven about an axis essentially parallel to said disc axis are arranged opposite said circular disc means and define a generated surface and extend a small amount into said cross-section of said guiding chute means through said bottom surface means and at least one of said side wall means.

16. A device as claimed in claim 2, wherein rotational body means rotatingly driven about an axis essentially parallel to said disc axis are arranged opposite said circular disc means and define a generated surface and extend a small amount into said cross-section of said guiding chute means through said bottom surface means and at least one of said side wall means.

17. A device as claimed in claim 7, wherein rotational body means rotatingly driven about an axis essentially parallel to said disc axis are arranged opposite said circular disc means and define a generated surface and extend a small amount into said cross-section of said guiding chute means through said bottom surface means and at least one of said side wall means.

18. A device as claimed in claim 15, wherein said generated surface has a cross-section profile which corresponds essentially to said cross-section of said guiding chute means.

19. A device as claimed in claim 16, wherein said generated surface has a cross-section profile which corresponds essentially to said cross-section of said guiding chute means.

20. A device as claimed in claim 1, wherein said guiding chute means open into turning chute means defining a cross-section which merges into an essentially parallelogram-shaped cross-section immediately downstream of said uprighting station by torsion of at least one of said side wall means of said guiding chute means.

* * * * *